May 21, 1968   J. D. LEITCH ETAL   3,384,248
UNLOADING SYSTEM AND METHOD
Filed Oct. 27, 1965   4 Sheets-Sheet 2

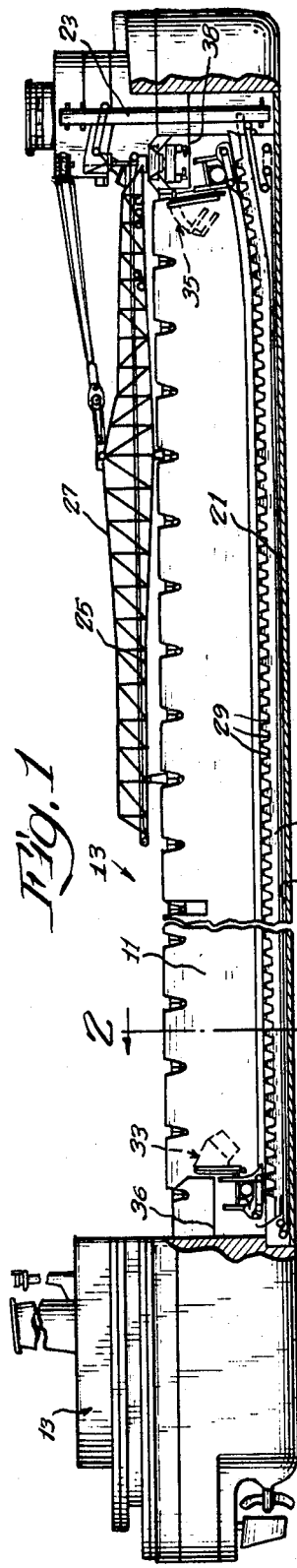

Inventors:
Jack D. Leitch
and Nolan H. Williams
By   Attys

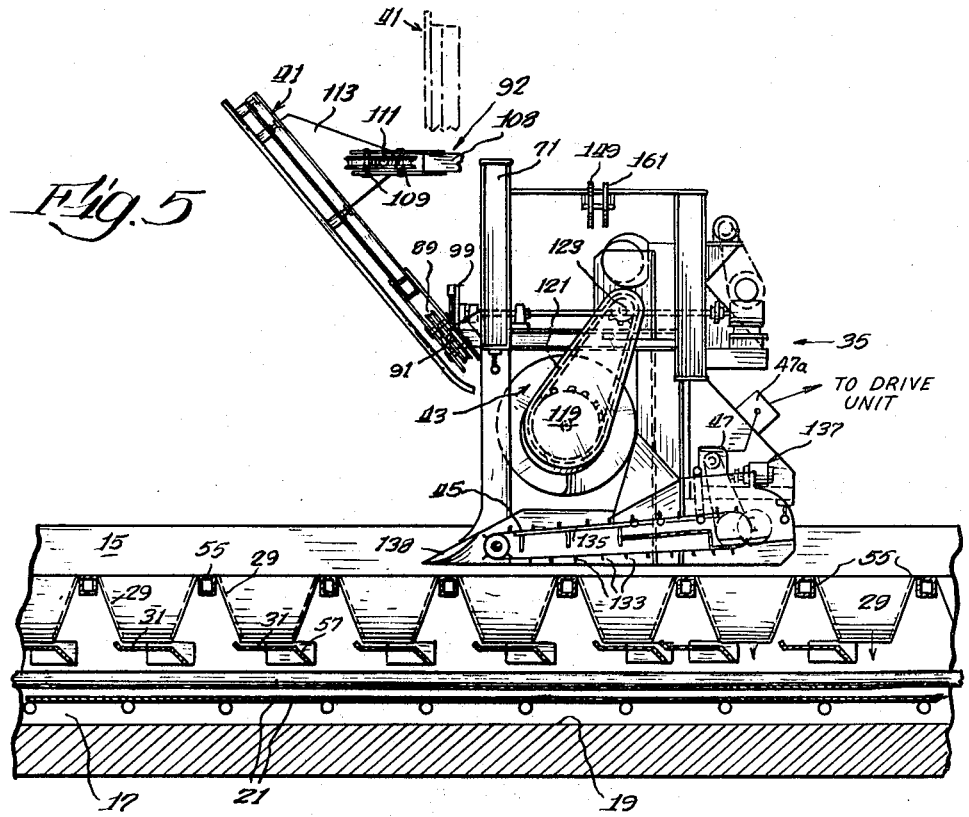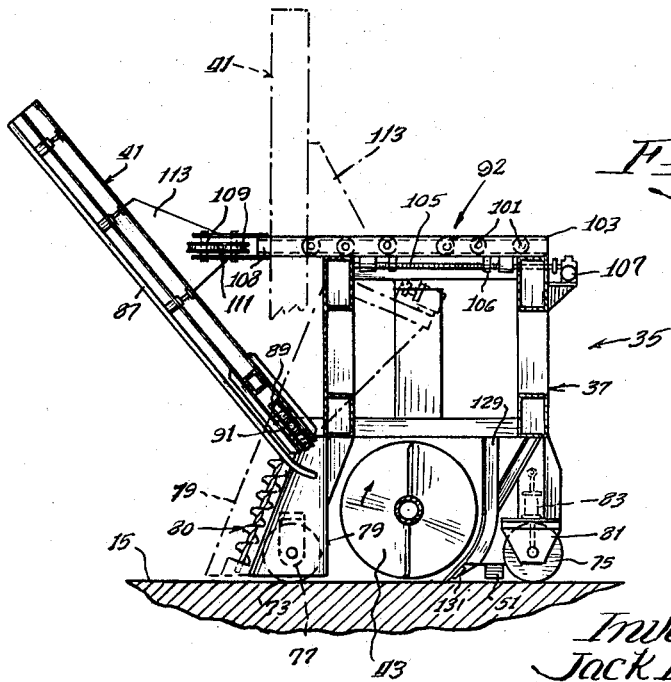

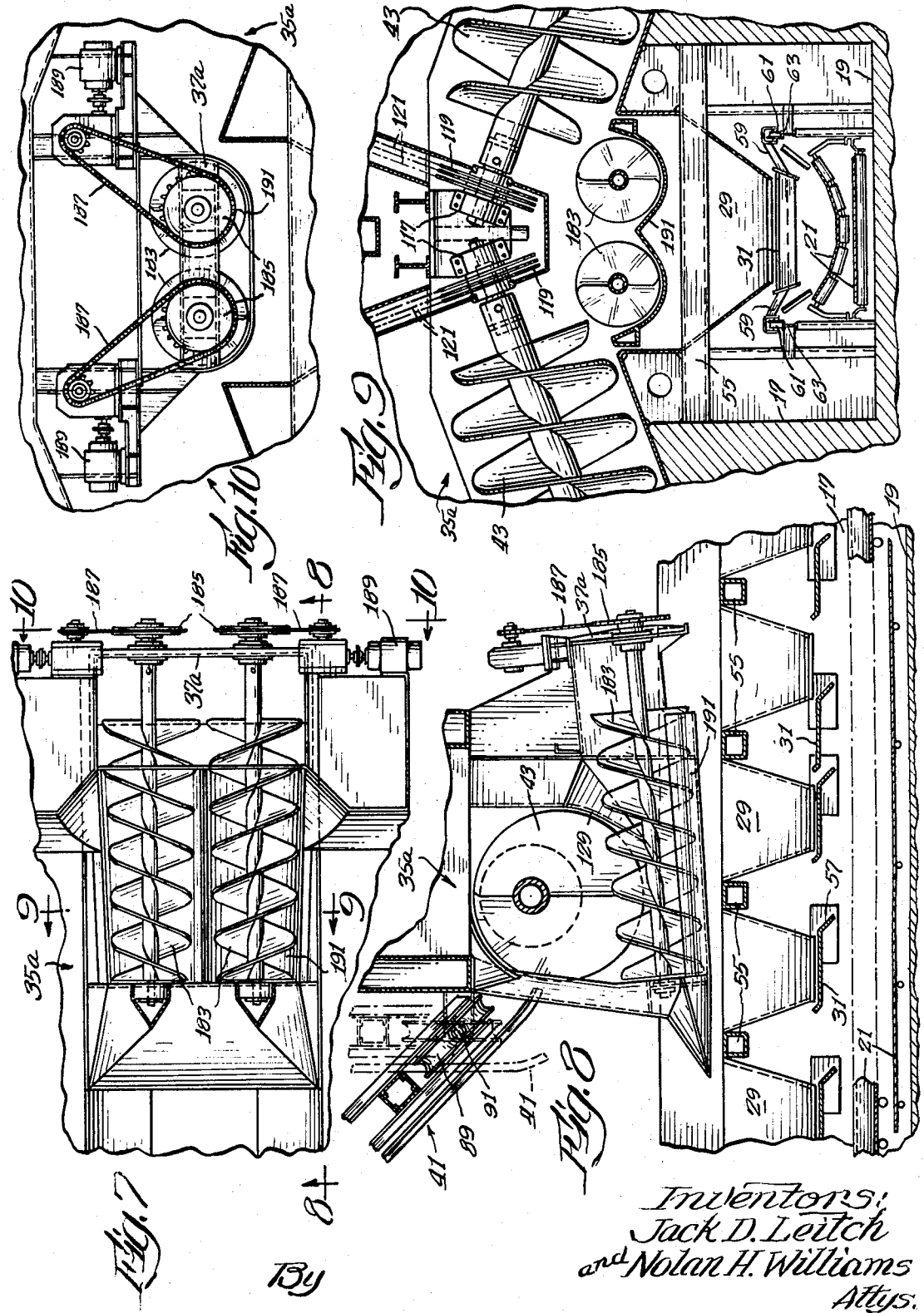

United States Patent Office 3,384,248
Patented May 21, 1968

3,384,248
UNLOADING SYSTEM AND METHOD
Jack D. Leitch, Toronto, Ontario, Canada, and Nolan H. Williams, Palatine, Ill., assignors to Upper Lakes Shipping, Ltd., Toronto, Ontario, Canada, a corporation of Canada
Filed Oct. 27, 1965, Ser. No. 505,368
23 Claims. (Cl. 214—2)

ABSTRACT OF THE DISCLOSURE

The storage within, and unloading of bulk material from, a compartment having a longitudinally extending conveyor disposed in a channel, gates controlling communication between the compartment and channel, and a reclaimer movable through the compartment to direct material toward the conveyor.

---

The present invention relates to system for unloading bulk material from storage enclosures and, more specifically, to systems particularly adapted for unloading the hold of a cargo vessel.

Many factors must be taken into consideration in the design of a storage and unloading system for vessels transporting bulk materials such as grain, coal, ore and stone. When the material being transported is of low bulk density, e.g., grain, the system must permit the maximum utilization of the space within the hold of the vessel. For this reason, system which depend entirely upon gravity flow of the material are generally not satisfactory for storage of materials of low bulk density since an inefficient use of space is inherent in their design. For example, such gravity flows systems generally include two or more hoppers are ranged within the hold of the vessel with each hopper positioned over a suitable conveyor. The side walls of the hopper slope sharply upwardly to insure a steady flow of the material, but, in so doing, leave a large space between the walls of the hopper and the sides of the vessel which is unavailable for the storage of material.

Another important factor to be considered in the design of such a system is the distribution of weight within the vessel as it is being unloaded. Thus, a vessel must be unloaded generally uniformly along its length to prevent stresses from being set up due to a concentration of the load in certain parts of the vessel.

Also, if the vessel is not to be unloaded solely by gravity flow, and other equipment is to be utilized, provision must be made to place such equipment on board the vessel when it arrives in port or, if such equipment remains permanently on the vessel, for storage of the equipment when the vessel is underway.

Finally, the system must be capable of unloading the vessel rapidly when it arrives in port, and should preferably be capable of being operated with a minimum of attention on the part of an operator.

Of course, these factors must also be taken into consideration to a greater or lesser degree in the design of land based storage and unloading systems. However, they are of particular concern in the design of such systems for vessels.

It is thus the principal object of the present invention to provide a storage and unloading system which is adaptable for land and marine use but which is particularly suited for use aboard a cargo vessel.

Another object of the invention is to provide a storage and unloading system for bulk material in which gravity flow of the material may be utilized in the unloading process without sacrifice in storage capacity.

A further object of the invention is to provide an improved method and apparatus for effecting rapid and efficient unloading of a storage enclosure of maximum storage capacity.

A still further object of the invention is to provide a cargo vessel which can be used to store bulk material in an efficient and economic manner without the provision of separate storage hoppers within the hold of the vessel.

Another object of the invention is to provide an improved method and apparatus for fully automatically unloading bulk material from the hold of a cargo vessel without utilizing gravity flow.

Other objects of the invention and the features thereof will be apparent from the following description taken in connection with the accompanying drawings wherein:

FIGURE 1 is a partially broken-away fragmentary center sectional view of a vessel showing various of the features of the invention;

FIGURE 2 is an enlarged fragmentary front elevational view, partially sectioned, taken along line 2—2 of FIGURE 1, with certain parts removed for clarity of illustration;

FIGURE 4 is an enlarged fragmentary plan view taken along the line 4—4 of FIGURE 2;

FIGURE 5 is a fragmentary elevational view taken along the line 5—5 of FIGURE 2;

FIGURE 6 is a fragmentary sectional elevational view taken along the line 6—6 of FIGURE 2;

FIGURE 7 is a top plan view illustrating an alternate embodiment of the invention;

FIGURE 8 is a fragmentary sectional view taken along the line 8—8 of FIGURE 7;

FIGURE 9 is an enlarged fragmentary sectional view taken along the line 9—9 of FIGURE 7; and FIGURE 10 is a fragmentary sectional elevational view taken along the line 10—10 of FIGURE 7.

Figure 3:
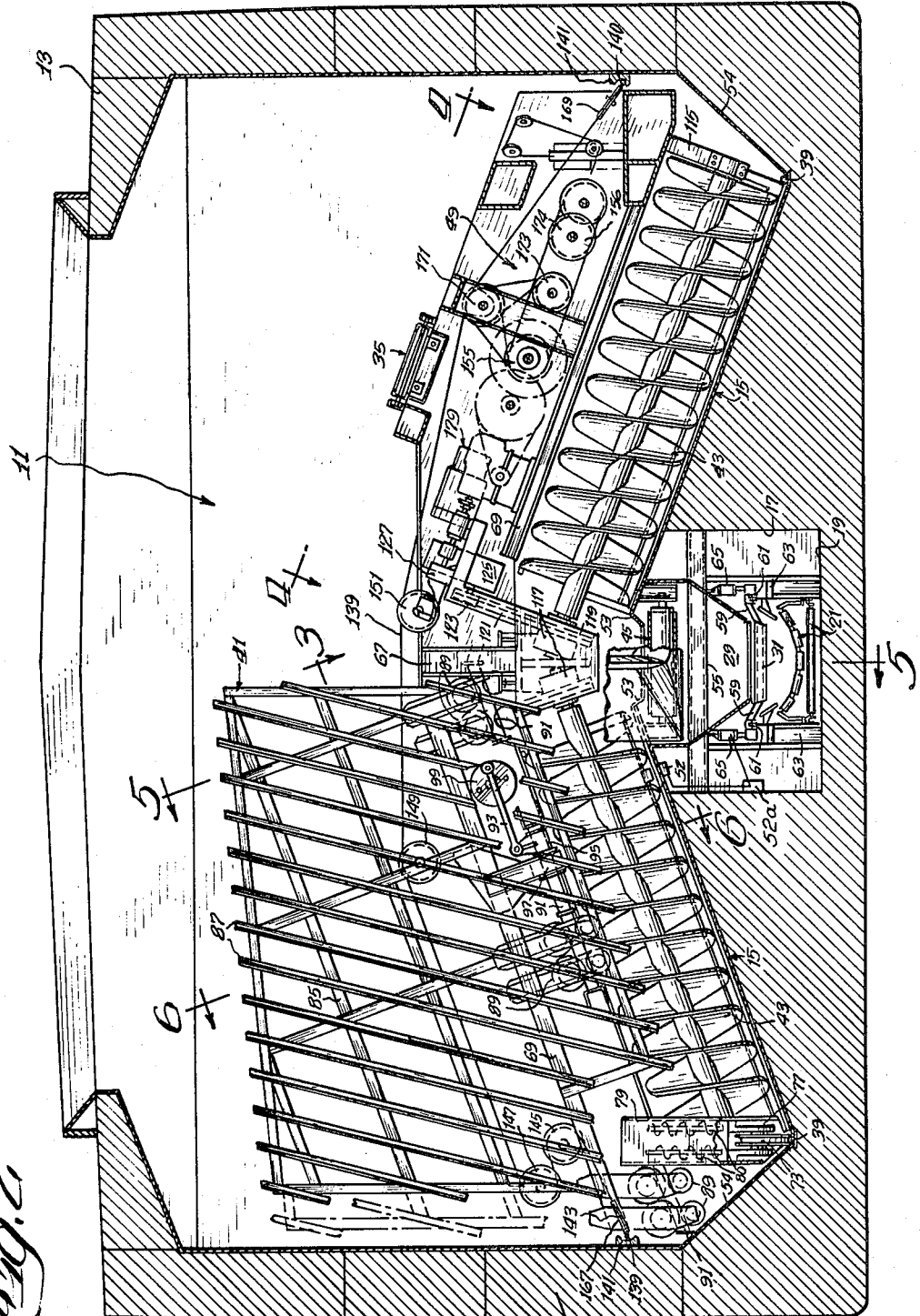
FIGURE 3 is an enlarged fragmentary plan view taken along the line 3—3 of FIGURE 2.

Certain embodiments of the invention shown in the drawings are particularly adapted for unloading bulk material cargo from the hold 11 of a vessel 13. However, it should be apparent that the invention hereinafter described has application in the unloading of bulk material from other types of storage enclosures as well, and that the specific embodiments are presented by way of example only.

Referring now generally to the embodiment illustrated in FIGURES 1–6, the hold 11 of the vessel 13 is defined along its lower surface by a floor 15 (FIG. 2) which supports the bulk material within the hold and which is arranged to define a channel 17 positioned generally centrally of the vessel and extending longitudinally from one end of the hold to the other. The base 19 of the channel 17 constitutes the lowest point within the hold so that the bulk material will flow by gravity into the channel. A conveyor 21 is supported adjacent the base 19 of the channel and is adapted to transport material lengthwise of the hold to a suitable apparatus 23 at the forward end of the vessel which raises it to deck level for eventual delivery to a conveyor 25 of a boom 27 adapted to extend laterally of the vessel to a suitable shore installation (not shown). In the illustrated embodiment, the apparatus 23 is in the form of a bucket elevator but it should be apparent that other systems such as, for example, a series of two or more belt conveyors at the stern of the vessel, might also be employed.

Bulk material flows into the channel 17 and onto the conveyor 21 through chutes 29 (FIG. 5) which extend downwardly into the channel from the level of the floor 15 into vertically spaced relation to the conveyor 21. Each chute is provided with a gate 31 at its lower end which controls the flow of material onto the conveyor. These gates are closed when the hold is full and the vessel is under way, but can be selectively opened to provide outlets of varying size through which material in the chutes can flow onto the conveyor.

Unloading of bulk material, such as grain or iron ore, from the hold 11 may be accomplished entirely automatically, as described in a later embodiment. In the principal embodiment, however, unloading is effected initially by gravity flow. More specifically, the gates 31 are selectively opened to unload the vessel uniformly along its length so that no structural strains will be encountered due to an uneven load distribution within the hold. The degree to which the gates are opened depends upon the desired cargo flow, the gates being generally gradually opened by manual control of certain equipment hereinafter described until all of the bulk cargo in the hold which will flow through the chutes by gravity is removed.

After gravity unloading has effected the removal of all possible material from the hold 11, considerable quantities of additional material will generally remain packed in huge mounds or piles along the areas flanking the channel 17 and bordering the sides of the hold. In order to remove this material, a pair of traveling reclaimer machines 33 and 35 are provided (FIG. 1). In the principal embodiment, these machines are permanently installed on the vessel and are housed under shelter plating 36 and 38, respectively, at each end of the hold 11 when the hold is either completely filled or empty and the ship is under way, but are movable longitudinally of the hold to dislodge the cargo from along the sides of the hold while at the same time controlling the flow of the cargo from such piles into the channel 17 and onto the conveyor 21. Normally, each of the traveling reclaimer machines 33 and 35 moves from its respective end of the hold 11 to approximately midship; however, each reclaimer is capable of traveling the full length of the hold if necessary, should one of the machines become inoperative. With such an arrangement, unloading of the hold is effected from the bow and stern of the vessel toward midship. If desired, one of the reclaimers might be located midship to travel in a direction away from the other reclaimer. With either arrangement, the distribution of the weight of the cargo during unloading can be controlled to some extent through the location of the reclaimers at the time the vessel is loaded.

Each reclaimer comprises (FIG. 2) a wheeled under carriage or frame 37 which is guided for movement above the conveyor 21 on tracks 39 defined by the floor 15. The frame supports a pair of oscillating harrows or rakes 41 which are adapted to engage the material lining the walls of the hold to dislodge this material and cause it to flow to the floor 15 of the hold and, generally, toward the reclaimer. Rotating screw conveyors 43 supported by the frame 37 of the reclaimer adjacent the floor 15 move the dislodged material toward a belt conveyor 45 suspended from the frame below the level of the floor, directly above the channel 17, and in vertically spaced relation to the gates 31 of the chutes 29. The conveyor 45 is equipped with an electronic scale 47 (FIG. 5) which measures the bulk flow of material and is electrically coupled to a drive unit 49 of the reclaimer to control the speed thereof depending upon the rate of recovery of the materials. A gamma source 51 on the reclaimer (FIG. 6) actuates gamma switches 52 (FIG. 2) which cause the gates 31 to be opened sequentially as the reclaimer advances along the floor of the hold.

Referring now more specifically to the aforementioned structure, the floor 15 of the hold 11 (FIG. 2) comprises a pair of longitudinally extending floor sections arranged on opposite sides of the center of the vessel with their inner edge portions 53 spaced from one another in overhanging relation to the mouths of the chutes 31. While the floor sections might be arranged horizontally if desired, each section in the illustrated embodiment slopes downwardly away from the center of the vessel except for the outer edge portion 54 of the section, which becomes horizontal to receive the track 39 for the reclaimer and then slopes upwardly and outwardly. As will be noted in FIGURE 2, a substantial area of the floor 15 is below the upper edge of the channel 17 and chutes 29, thus forming pockets along each side of the conveyor 21. This arrangement could not be tolerated in a vessel employing an unloading system depending entirely upon gravity flow to a central conveyor, and where a floor having the reverse slope, i.e., upwardly and outwardly from a central channel, is frequently employed. However, unloading of low areas or pockets adjacent the channel 17 can be easily accomplished by the reclaimers 33 and 35 of the present invention, thus making available a considerable storage volume which would otherwise be unusable.

It will be noted that in the vessel construction shown, the entire hold is available for the storage of material with a single conveyor being provided. The present construction is readily distinguishable therefore from previous constructions in which as many as eight hoppers and associated conveyors were arranged within the hold of a vessel. Thus, none of the space within the hold is rendered unavailable as is the case when hoppers are used.

The conveyor 21 supported on the base 19 of the channel 17 (FIG. 2) is of the belt type, preferably contoured to provide it with a high capacity. Hollow beams 55 span the channel adjacent its upper edge and serve to support the chutes 29, one of which is positioned intermediate each adjacent pair. Each of the gates 31 is in the form of a flat plate (FIG. 5) turned downwardly at its forward end to provide a deflector 57 for diverting material passing through the chute, and turned upwardly along its lateral edges to define side walls (not shown). A pair of arms 59 (FIG. 2) project laterally from each side of each of the gates 31 and are provided with wheels 61 at their outer ends which ride on rails 63 extending along the side walls of the channel 17. Each gate is therefore supported independently of its respective chute 29.

Each of the gates 31 is moved between an open and a closed position by a pair of air cylinders 65, each of which includes a shaft (not shown) connected to one of the arms 49 at each side of the gate. The operation of each pair of air cylinders is governed by an air control valve (not shown) which may be operated manually, or by a solenoid valve (not shown) which is operated automatically. The manual control of the air control valve permits selective opening of the gates and thereby permits control over the extent to which the gates are opened during gravity unloading. This control is desirable since different materials exhibit different flow characteristics, some materials flowing slowly and requiring large gate openings and others flowing rapidly and requiring small gate openings. Selective control is thus required. During the gravity flow stage, therefore, operators alternately open various gates as dictated by the unloading pattern necessary to prevent excessive structural strains within the vessel, such as would be created by a radical unbalance of the load. After the completion of the gravity flow stage, the gates are returned to a closed position and are thereafter opened automatically, as hereinafter described.

Automatic control of the gates by means of the solenoid valve and, hence, automatic control of the opening of the gates is accomplished by means of the gamma switches 52. One such switch is provided for each pair of gates and is located immediately below the floor 15 in spaced relation to the inner edge thereof and adjacent the upper edge of one of the chutes of the pair of gates. Each switch is electrically connected through a control 52a to the valve of the air cylinder 65. When the gamma source 51 passes over the switch, the switch is actuated by radiation through the steel floor and operates the solenoid valve to allow a slow bleeding of air into the air cylinder 65 of the pair of gates adjacent the switch, thus causing the respective gates to open slowly. Accordingly, even if the reclaimer causes the chutes 29 of such switch to be filled as it passes over them, the material will be fed at a low rate from the chutes because the gates are opened very slowly. The gates opened by the switches 52 remain open until the operation of the reclaimer is completed, after which all of the gates can be closed simultaneously by a master switch (not shown).

It should be noted that the use of gamma switches and a gamma source makes possible the provision of a plurality of switches, individually actuable, yet not exposed to contact with the stored material. This is an important consideration in view of the fact that the entire hold is filled during transport, and in view of the fact that the weight of the cargo would probably make pressure actuated switches unsatisfactory.

The construction of the reclaimers 33 and 35 will now be described in detail. Since each is, for all practical purposes, identical to the other, only the reclaimer 35 will be described.

The frame 37 of the reclaimer 35 is formed of heavy beams or plate work to enable it to support the weight of the various elements and to withstand the forces to which it is subjected during operation. It includes (FIGS. 2, 5 and 6) a central section 67 which overhangs the channel 17 and from which the conveyor 45 is suspended, a pair of outrigger sections 69 which extend laterally from the center section to adjacent the side walls of the hold, and a superstructure 71 supported generally on the center section 67.

The frame rests on a pair of aligned wheels 73 and 75 located at each end of each outrigger in engagement with a track 39. The forwardmost wheels 73 are attached directly to the frame 37 by heavy brackets 77, and are enclosed on three sides by a plow-type shield or pant 79 which protects the wheel bearings from contact with the material being unloaded and which also serves to divert material away from the wheels as the reclaimer advances through the hold. A pair of side-by-side vertically oriented motor driven screw conveyors 80 are disposed adjacent the forward edge of each pant to provide a channel through which the pant and, hence, the wheels, may travel.

The rear wheels 75 are not rigidly mounted directly to the frame but, instead, are mounted in a manner which permits the rearward end of the frame to be elevated so that when the reclaimer traverses the hold in returning to its starting position after the hold has been emptied, certain of the components thereof, as hereinafter described, may be moved out of contact with the floor 17, thereby permitting a greater speed of movement of the reclaimer. Accordingly, the rear wheels 75 (FIG. 6) are mounted in brackets 81 which are attached to the shafts of a pair of hydraulic cylinders 83 mounted on the frame and connected to a suitable pump (not shown) carried by the frame. Actuation of the hydraulic cylinders elevates the rearward end of the reclaimer approximately four inches, a distance sufficient to permit the components to clear the floor 15.

Frequently, the sides of a vessel will bulge outwardly under load when the hold of the vessel is filled but will return to their normal condition when the vessel is empty. In the vessel of the principal embodiment, this variation can cause the location of the tracks to vary as much as two inches. To permit the reclaimer to adapt to this variation, the wheels 73 and 75 on one side of the vessel, e.g., the port side, are double flanged (not shown) while the wheels on the opposite (starboard) side have only a single flange which is located adjacent the inside of the track (FIG. 2).

The harrows are intended to disturb the material in the hold so as to cause it to flow toward the screw conveyor 43 while at the same time retaining the material so that surging toward the screw does not occur. The harrows are mounted on the superstructure 71 of the frame adjacent the forward end thereof, and each is generally in the form of a large rake (FIG. 2) of sufficient size to cover the area in front of the reclaimer on one side of the center thereof, i.e., one harrow covers the port side of the reclaimer and the other covers the starboard side. Only one such rake is shown in FIGURE 2, the other being removed for clarity of illustration. Each harrow comprises a frame 85 supporting a plurality of rods 87 inclined slightly to the vertical so as to extend upwardly and away from the sides of the vessel.

The harrows are supported on the frame 37 for oscillating movement toward and away from each other and in this regard, each harrow is provided with sets 89 of guide wheels adjacent its lower edge (FIGS. 5 and 6), each set comprising a pair of wheels having concave treads and spaced from each other a sufficient distance to permit a sturdy support pipe 91 to be received therebetween. The pipe 91 is inclined relative to the horizontal so as to be generally parallel to the inclined section of the floor 15. The wheels 89 permit the harrow to move laterally along the pipe and also to rotate about the pipe, for reasons hereinafter set forth, so as to vary the angle of inclination of the harrow. The upper end of each harrow is connected to and supported by a positioner carriage 92, hereinafter described.

Each harrow is moved along the pipe 91 laterally (a distance of about two feet in a preferred embodiment in which the pipe is approximately thirty feet in length) at a rapid rate, e.g., eight full cycles per minute. The movement of the two harrows is synchronized so that both move inwardly or both move outwardly at the same time, thereby avoiding a large unbalanced thwartship thrust on the reclaiming machine. In the illustrated embodiment, movement of each harrow is effected automatically by means of a crank 93 (FIG. 2), one end of which is provided with a collar 95 which encircles but is not rigidly affixed to a shoe 97 secured to the harrow frame 85 but slidable along the pipe 91. Thus, the collar 95 is rotatable relative to the shoe while the shoe is slidable and rotatable relative to the pipe 91 but is affixed to the harrow. This connection between the crank and harrow frame permits thrust to be transmitted to the harrow while permitting rotation of the harrow about the pipe 91 relative to the crank. The end of the crank 93 opposite to that connected to the harrow is secured to a circular plate 99 rotatably mounted on a shaft (not shown) of a speed reducer (not shown). The speed reducers of the two harrows are driven through a common shaft (not shown) by a suitable electric motor (not shown).

The reclaimers 33 and 35 operate most efficiently when the material being unloaded flows at a uniform rate, without surging, from its piled, packed disposition along the sides of the hold toward the screw conveyors 43, hereinafter described. This condition is achieved when the harrows are disposed at a forwardly inclined angle to the vertical, the most effective angle varying with the material being unloaded. Thus, in the illustrated embodiment, each harrow is movable between a generally vertical position, as shown in phantom in FIGURE 6, and a position in which it is inclined approximately 45° to the vertical. This movement of each harrow is accomplished by one of the positioner carriages 92 (FIG. 6), previously referred to, one carriage being provided for each harrow.

Each carriage 92 is supported by four wheels (not shown) carried on opposite ends of shafts 101 mounted in roller bearings attached to the carriage. The wheels ride in rails 103 which are secured to the top of the superstructure of the reclaimer frame 37 and which extend parallel to the direction of movement of the reclaimer. Movement of the carriage 92 along the rails is effected by the rotation of a pair of threaded shafts 105 which extend parallel to the rails and pass through nuts 106 secured to the bottom of the carriage. Rotation of the screws and, hence, forward and rearward movement of the carriage 92, is preferably controlled directly by the operator of the reclaimer by means of a suitable power unit 107 and is not automated.

The carriage 92 is connected to its respective harrow by a link 108, one end of which is pivotally connected to the forward end of the carriage. The opposite end of the link is provided with a set of wheels 109 having concave treads, the wheels 109 being arranged with their axes generally vertical and being horizontally spaced from each other a sufficient distance to receive between the respective treads a horizontally disposed cylindrical rod 111 secured to the harrow by brackets 113. The pivotal connection of the link 108 to the carriage compensates for the arcuate path of movement of the rod 111; the rod-wheel connection between the forward end of the link and the harrow permits pivotal movement of the harrow relative to the link while also permitting the previously described lateral oscillatory movement of the harrow relative to the link.

As previously mentioned, the harrows 41 engage the piles of bulk material disposed along the sides of the hold 11 of the vessel and, by virtue of their oscillating movement, cause material to flow from the piles downwardly in front of the machine onto the inclined or outwardly and downwardly sloping sections of the floor 15 immediately in front of the reclaimer. This material is engaged by the screw conveyors 43 and transferred behind the reclaimer to the belt conveyor 45 for deposit into the chutes 29.

The screw conveyors, which are seen most clearly in FIGURE 2, engage material piled forwardly of the reclaimer and transport it rearwardly to chutes behind the reclaimer and over which the reclaimer has passed. In this manner, an even flow of material is conveyed to the chutes, which are thus not affected by a flooding of the material forwardly of the reclaimer, such as might be precipitated by the operation of the harrows.

Each of the screw conveyors is of large diameter, e.g. seven feet, and of double helix design formed of a steel plate welded to a central tubing. One of the screws is suspended beneath one of the outriggers 69 at each side of the central belt conveyor 45 and, since both screws move the material in the same direction and are rotated by a common drive, one is provided with a right hand thread and one with a left hand thread.

Each screw is suspended beneath its associated outrigger with the axis of the screw parallel to the sloping section of the floor 15, and with the outer periphery of the screw elevated between two and three inches above the floor to allow for deformation of the vessel hold, future internal structural adjustments, and/or deformation of the reclaimer structure itself.

The lower or outer end of each screw abuts and is journalled in a suitable bearing supported by a back-up beam 115 depending from the end of the outrigger; the upper or inner end of each screw is mounted in a suitable bearing 117 and has keyed to it a chain sprocket 119 connected by a chain 121 to a sprocket 123 of a gear reducer 125 driven by a motor 127. The inner end of the threads of each screw is positioned immediately adjacent the inner edge 53 of the sloping section of the floor 15.

Rotation of the screws is automatic once the operation of the reclaimer has been commenced unless a sudden flooding of material should occur which would cause an excess of material to accumulate above the conveyor 45, soon to be described. In such an event, a probe (not shown) located between the two screws would be engaged by the material and the operation of the screws would be halted. The rotation of the screws would be commenced again as soon as the probe was cleared. Another safety probe (not shown) is also provided to halt the entire operation of the reclaimer if the gates 31 do not open properly and material begins to pile up within the chutes.

Since the screws are elevated a short distance above the floor, for reasons previously set forth, a certain amount of material will pass under the screws and will not be initially contacted by the screws so as to be conveyed to the belt conveyor 45. To effect recovery of this material, a backing plate 129 is provided (FIG. 6) having a curved lower end in close proximity to the lower rearward portion of each screw. The bottom of the backing plate has clamped thereto a rubber strip 131 which engages the floor 15 behind the reclaimer after the reclaimer has passed and thus functions in the manner of a squeege. The plate 129 pushes the material left by the screw forwardly into contact with the screw, which thus transfers it to the belt conveyor 45. When the reclaimer is returning to the end of the hold, the actuation of the hydraulic cylinders 83 elevates the rear of the frame 37, and the rubber strip 131 of the backing plate is brought out of contact with the floor.

The belt conveyor 45 (FIGS. 2 and 5) is suspended beneath the frame 37 of the reclaimer and is approximately the width of the gates 31 of the chutes 29. In one suggested embodiment, the conveyor is in the form of an endless belt six feet in width which is rubber covered with cleats 133 vulcanized to its surface. The conveyor is positioned with its forward end located below and slightly forwardly of the screws and with its rearward end projecting rearwardly somewhat past the rearward end of the frame 37. The rearward end of the conveyor is maintained at a slightly higher elevation than the forward end to permit better control over the flow from the conveyor. A slide plate 135 is supported immediately beneath the upper run of the belt in the loading area beneath the screws to reduce the strain on the belt. The belt is driven by a suitable power unit 137. The screws are assisted in depositing material on the conveyor 45 by a plow 138 carried by the frame 37 and adapted to deflect material onto the conveyor.

To insure maximum efficiency of operation by each reclaimer, it is necessary that the flow of material from each into the chutes 29 be at an optimum rate. The rate of flow is, of course, dependent upon the cross section of material in front of the reclaimer and the speed at which the reclaimer advances. Since optimum efficiency occurs when the belt conveyor 45 carries its full capacity, the speed of advancement of the reclaimer of the illustrated embodiment is caused to be controlled by the capacity of the belt at any given time.

This is accomplished in the illustrated embodiment by means of the scale 47 (FIG. 5) which measures the total load on the belt conveyor 45 and is connected to a control 47a which converts the information into an electrical signal and relays it to the drive unit 49 of the reclaimer so as to determine the speed of operation of the reclaimer drive unit. This scale is of the nuclear radiation type and measures the thickness of the material on the belt and converts the reading to tons.

Movement of the reclaimer through the hold is desirably accomplished by a positive drive which is capable of urging the reclaimer forwardly into the mass of bulk material, which does not depend on traction wheels for its propulsion, which is not subject to clogging by the material in the hold, which does not subject the reclaimer to skewing, and which permits both forward and rearward movement of the reclaimer with little difficulty. In the illustrated embodiment, this is accomplished by a cable friction drive in which a pair of cables attached at each end of the hold and along each side thereof pass through the reclaimer and are engaged thereby to effect the desired movement.

More specifically, and with reference to FIGURES 2, 3 and 4, cables 139 and 140 for movement of the reclaimer 35 extend the length of the hold along the port and starboard sides respectively. Both are used by the reclaimer 35, a similar set being provided for the reclaimer 33. Each cable is fastened at opposite ends of the hold by turn-buckles (not shown) for initial or future take up and equalization of cable lengths, and each is supported between the reclaimer and the turnbuckles by small plate brackets 141 (FIG. 2) extending from the side walls of the hold. Each bracket 141 is capable of supporting two cables, one for each reclaimer.

Cable 139 entering the reclaimer, for example, from the front port side as the reclaimer advances, passes around a sheave 143 and then laterally across the reclaimer around sheaves 145, 147, 149, 151 and 153 and around a grooved drum 155. After a number of wraps around the drum 155, the cable passes around a take up roller 156 and then is again wrapped around the drum several times. The cable extends laterally from the drum in the direction from whence it came, i.e., toward the port side, passes around sheaves 157, 159, 161, 163, 165, and around a sheave 167, outwardly of the reclaimer, then rearwardly along the port wall of the hold. The cable 140 entering the reclaimer from the front starboard side passes around a sheave 169, then laterally of the reclaimer around a sheave 171, thence around a drum 173 for several wraps, around a take up roller 174, back around the drum, and then laterally in the opposite or starboard direction around sheaves 175 and 177 outwardly of the reclaimer and rearwardly along the starboard wall.

The drum 155 is driven by a suitable power unit 179 which preferably is an electric motor which receives its power supply through electrical cables (not shown) suspended in loops from an overhead trolley. However, a self-contained diesel engine might also be employed. The drum 173 is free to rotate. As previously mentioned, the electrical power supply to the power unit is controlled by the scale 47. The take up rollers 156 and 174 are provided with a counterweighted gravity take up and permit the direction of movement of the reclaimer to be reversed without adjusting tensions at the ends of the cables.

In the operation of the system, operators manually control the gravity unloading of the hold 11 by operating suitable valves to control the movement of the gates 31 so as to assure an even flow of material onto the conveyor 21. The gravity unloading stage is completed when all of the gates are fully open and no further material flows from the hold by gravity. The gates are then all moved to a closed position and further operation is accomplished by the reclaimers.

The reclaimers 33 and 35 commence operation from parked positions in sheltered areas at opposite ends of the hold or at midship if so desired. In the initial operation of each reclaimer, the belt conveyor 45 is actuated while the harrows 41 are allowed to remain at rest. The screws are then started and stopped to clear the area in front of the reclaimer. After this has been accomplished, the harrows are caused to move back and forth across the face of the reclaimer in a vertical position while the screw conveyors 43 are operating, and the harrows are then gradually inclined until the most desirable angle has been reached. The reclaimer is then placed on automatic operation, in which condition the harrows 41, screw conveyors 43 and belt conveyor 45 are in continuous operation and in which the rate of advancement of the reclaimer is determined by the scale 47. As the reclaimer advances, the gamma source 51 passes over gamma switches 52, causing the gates 31 associated therewith to be opened slowly so as to allow the material to flow gradually onto the conveyor 21. The gates remain open until the reclaiming operation has been completed, after which they are closed by a master switch.

Upon completion of the reclaiming operation, the hydraulic cylinders 83 are actuated to elevate the rearward end of the reclaimer and, hence, to elevate the lower end or rubber strip 131 from the floor 15. The reclaimer is then driven in a reverse direction to the sheltered area at the end of the hold. The reclaimer may be fixed in the parked position in any suitable manner, as by bolts or clamps. The harrows are then moved to a vertical position.

FIGURES 7–10 illustrate an alternate embodiment of a of a reclaimer 35a which is similar to the reclaimer 35 of FIGURES 1–6 except for the substitution of a pair of longitudinally extending screw conveyors 183 for the belt conveyor 45. The screws 183 which are more suitable than the belt conveyor 45 when rugged or abrasive materials are being transported, are suitably journalled at opposite ends in appropriate portions of a frame 37a, which may be modified if necessary, and each has mounted on its rearward end a sprocket 185 connected by a chain 187 to a gear reducer driven by a motor 189. A plate 191 is positioned beneath the screws 183 and is shaped to fit closely adjacent the outer periphery thereof. The material moved by the screws is delivered over the rearward edge of the plate into chutes 29 over which the reclaimer has passed.

The above-described operation of the disclosed apparatus is semi-automatic in nature, i.e., the operation is automatic except for the initial gravity flow unloading in which the movement of the gates is controlled by personnel. In so far as the unloading of cargo vessels is concerned, however, it is preferable that the system be as fully automatic as possible since the composition of a crew is subject to frequent change and the presence of skilled or experienced crewmen can thus not be assured.

The previously described system can be made fully automatic, if desired, by certain modifications. In a fully automatic system, the gravity flow step, as such, is dispensed with and the operation is commenced by activating the reclaimers. Since none of the material has been removed from the hold at the time the reclaimers commence operation, their progression through the hold will be somewhat slower. However, their operation remains essentially unchanged in so far as the rakes, the conveyor on the reclaimer, and the opening of the gates of the chutes by means of the gamma switches is concerned.

Instead of employing scales on the reclaimer, as previously described, to regulate the amount of material on the reclaimed conveyor 45, scales (not shown) are provided instead within the hold of the vessel to measure and regulate the amount of material on the conveyor 21 supported on the floor of the hold. One such scale is preferably provided in the center of the hold and another at that end of the conveyor 21 which is adjacent the bucket elevator 23. The reading of each scale controls the operation of one of the reclaimers. Thus, if the flow caused by the aft conveyor becomes too great, this fact is sensed by the midship scale and the reading of that scale causes the operation of the aft reclaimer to be temporarily halted. In like manner, if the flow caused by the operation of the fore reclaimer becomes too great, this fact is sensed by the fore scale which causes the operation of the fore reclaimer to be temporarily halted. The fore scale is connected to the midship scale so that the signal transmitted by it to the fore reclaimer is based upon the difference between the total load on the conveyor 21 at the fore end thereof and the load at midship.

With the modified system outlined above, the unloading of the vessel can be accomplished fully automatically and with a minimum of supervision. The system is thus particularly useful in the unloading of ships although it of course has application to all unloading systems.

A system particularly adapted for the unloading of the hold of a vessel has thus been shown and described with respect to two specific embodiments thereof. However, it should be apparent that the invention has application to the unloading of land-based enclosures and various modifications might be made in the embodiments shown and described without departing from the scope of the invention.

Various features of the present invention are set forth in the following claims.

We claim:

1. In a cargo vessel for handling bulk material, a bulk material receiving compartment extending substantially the length of the vessel, said compartment including side walls defined entirely by the sides of the vessel and including a floor defining a channel extending longitudinally of the compartment throughout the length thereof, a single conveyor located within said channel, means defining openings through which material supported on said floor can flow downwardly onto said conveyor, a gate supported adjacent each of said openings, each of said gates being individually movable between a first position in which it blocks said opening and prevents bulk material supported on said floor from flowing onto said conveyor and a second position in which said opening is essentially unobstructed, and selectively operable means for effecting controlled individual movement of each of said gates between said first and second positions, said means being such as to permit movement of any of said gates to be halted at any point between said positions so as to permit selective variation in the effective size of an opening, thereby controlling the rate of flow of material therethrough.

2. A system in accordance with claim 1 wherein each of said openings is defined by the lower end of a chute extending downwardly from the level of the floor above the conveyor.

3. A system in accordance with claim 2 wherein each of said gates is defined by a single piece of material movable in a plane generally transverse to the longitudinal axis of said chute.

4. A system for unloading bulk material from an enclosure defined at its lower end by a floor supporting such material, which system comprises a first conveyor located beneath a portion of the floor and extending the length of the enclosure, means defining openings through which material supported on said floor can flow downwardly onto said first conveyor, a gate supported adjacent each of said openings, each of said gates being individually movable between a first position in which it blocks said opening and prevents bulk material supported on said floor from flowing onto said first conveyor and a second position in which said opening is essentially unobstructed, a reclaimer movable above the floor, a second conveyor mounted on said reclaimer for moving material across the floor to said openings, power means mounted on said enclosure floor for automatically causing a gate in the vicinity of said reclaimer to be progressively but slowly moved from a first toward a second position so as to gradually increase the size of the opening adjacent to which said gate is supported and means responsive to the position of said reclaimer for controlling the operation of said power means.

5. A system in accordance with claim 4 wherein movement of said gates is effected by a fluid cylinder, and wherein said responsive means includes a valve for permitting fluid to bleed into said cylinder at a slow rate.

6. A system in accordance with claim 4 wherein said responsive means comprises a switch located beneath the floor adjacent an opening, said switch being adapted to be actuated when at least a portion of said reclaimer is positioned approximately directly above said switch.

7. A system in accordance with claim 6 wherein said switch is a switch sensitive to nuclear radiation, and wherein a source of nuclear radiation is mounted on the reclaimer effective to actuate said switch when in a predetermined position relative thereto.

8. A system for unloading bulk material from the hold of a vessel, which system comprises means defining a channel extending longitudinally of the hold generally centrally thereof, said channel having side walls extending upwardly from a bottom wall and terminating above said bottom wall, floor sections extending from the upper edges of said side walls of said channel outwardly and downwardly away from said channel to adjacent the sides of the hold, a conveyor supported within said channel on said bottom wall beneath the inner edges of said floor sections, and a reclaimer for transferring material supported on said floor sections onto said conveyor, said reclaimer being adapted to straddle said channel and including a screw conveyor positioned above each of said floor sections adapted to convey material on said sections toward said channel.

9. In a system for unloading bulk material from an enclosure provided with side walls, a floor, a longitudinally extending channel beneath said floor, and a longitudinally extending conveyor within said channel, the improvement which comprises a reclaimer for moving material across said floor into said channel and onto said conveyor, said reclaimer comprising a wheeled frame adapted to be moved longitudinally of the enclosure, said frame including a horizontally disposed rigid member extending transversely of the enclosure, a harrow for engaging material piled within said enclosure and for dislodging same, said harrow being mounted on said rigid member for oscillating traveling movement therealong and for pivotal movement thereabout, said harrow including a rigid horizontally disposed rod, means for effecting oscillating traveling movement of said harrow on said rigid member, a carriage carried on said frame above said rigid member for movement toward and away from said harrow, a link interconnecting said carriage and said rod of said harrow, said link being pivotally connected to said carriage and being connected to said rod so as to permit sliding movement of said rod relative to said link, selectively operable means for moving said carriage toward and away from said harrow so as to effect pivotal movement of said harrow about said rigid member, and means supported on said frame adjacent the floor of the enclosure for engaging material dislodged by said harrow and moving it to said channel and onto said conveyor.

10. A reclaimer in accordance with claim 9 wherein said means for effecting oscillating traveling movement of said harrow comprises a shoe slidably carried on said rigid member and fixed to said harrow, a collar rotatably mounted on said shoe but restricted to limited movement therealong, said shoe being therefore pivotable with said harrow about said rigid member and relative to said rigid member, a link connected to said collar, and means for effecting reciprocal movement of said link.

11. In a system for unloading bulk material from an enclosure provided with side walls, a floor, a longitudinally extending channel beneath said floor, and a longitudinally extending conveyor within said channel, the improvement which comprises a reclaimer for moving material across said floor into said channel and onto said conveyor, said reclaimer comprising a wheeled frame adapted to be moved longitudinally of the enclosure in a forward direction, a screw conveyor carried by said frame positioned above said floor in closely spaced relation thereto but out of contact therewith, said screw conveyor extending transversely of the enclosure and being adapted to move material disposed on the floor of the enclosure to the channel, a scraper disposed behind said screw conveyor adapted to engage the floor and to scoop material passing under the conveyors and direct it into the conveyors, and means for elevating the scraper out of contact with the floor for movement of the reclaimer in a rearward direction.

12. In a system for unloading bulk material from an enclosure provided with side walls, a floor, a longitudinally extending channel beneath said floor, and a longitudinally extending first conveyor within said channel, a reclaimer for moving material across said floor into said channel and onto said conveyor, said reclaimer comprising a wheeled frame supported on the floor and movable longitudinally of the enclosure, power means for effecting said longitudinal movement of said frame, a second conveyor in the form of a screw carried by said frame positioned above said floor in closely spaced relation thereto but out of contact therewith, said second conveyor extending transversely of the enclosure and being adapted to move material disposed on the floor of the enclosure in a direction opposite to the direction of movement of the reclaimer and to deposit same into the channel behind the reclaimer, and a third conveyor suspended from said frame above said first conveyor below that end of said second conveyor nearest the channel.

13. A reclaimer in accordance with claim 12 wherein a scale is provided to determine the rate of flow of material carried by said third conveyor.

14. A reclaimer in accordance with claim 13 wherein said scale produces an electrical signal transmitted to said power means, and wherein the operation of said power means is adapted to be directly controlled by the signal from said scale so that the extent of advancement of the reclaimer is inversely proportional to the rate of flow of material carried by said third conveyor.

15. A reclaimer in accordance with claim 12 wherein said third conveyor comprises a set of two helical screws.

16. In a system for unloading bulk material from an enclosure provided with side walls, a floor, a longitudinally extending channel beneath said floor, and a longitudinally extending conveyor within said channel, the improvement which comprises a reclaimer for moving material across said floor into said channel and onto said conveyor, said reclaimer comprising a wheeled frame adapted to be moved longitudinally of the enclosure, a harrow mounted on said frame adapted to engage a face of a pile of material on said floor, means for effecting oscillating movement of said harrow so as to cause material to be dislodged from the pile so engaged and to flow downwardly onto the floor, conveyor means supported by said frame adapted to transfer materials from the floor into the channel and onto the conveyor within the channel, and means for effecting movement of said reclaimer longitudinally of the enclosure including a power driven drum mounted on said frame, a cable having a midportion wrapped around said drum, means securing one end of said cable at one end of the enclosure and means securing the other end of said cable at the other end of the enclosure.

17. A system in accordance with claim 16 wherein upstanding tracks are provided on the floor of the enclosure which are engaged by wheels on the frame of the reclaimer, and wherein said wheels on one side of the reclaimer have a flange located adjacent each the inner and outer sides of the associated track and said wheels on the opposite side of the reclaimer have a single flange located adjacent the inner side of the track.

18. A reclaimer in accordance with claim 16 wherein said movement-effecting means includes a second idler drum mounted on the frame and a second cable wrapped around said second drum with its opposite ends secured at opposite ends of the enclosure.

19. A reclaimer in accordance with claim 18 wherein one of the two cables extends along one side wall of the enclosure and the other cable extends along the opposite side wall of the enclosure, and wherein a bracket is located at spaced points along the side wall to support the cable at intervals along its length.

20. A reclaimer in accordance with claim 16 wherein a roller is provided about which the cable passes to take up slack and facilitate the reversal of the direction of movement of the reclaimer.

21. A system for unloading bulk material from the hold of a vessel, said hold having a floor on which the material is supported, which system comprises a first and single longitudinally extending conveyor located beneath the floor of the hold, means controlling the flow of material from said floor onto said first conveyor, a reclaimer movable longitudinally of said hold, a second conveyor carried by said reclaimer for moving material transversely of said told toward said first conveyor, a third conveyor carried by said reclaimer for movement above said first conveyor and in alignment therewith, said third conveyor being located below the discharge end of said second conveyor, a fourth conveyor for receiving material from said first conveyor and elevating it to the deck level of the vessel, and a fifth conveyor for receiving material from said fourth conveyor and transferring it beyond the sides of the vessel.

22. A method of unloading a full capacity of bulk material from the hold of a vessel, said hold having a floor, a longitudinally extending conveyor beneath the floor, a longitudinally extending row of openings in the floor through which material can flow onto the conveyor, and gates movable into and out of obstructing positions relative to the openings, which method comprises selectively moving at least some of the gates to at least partially unobstructing positions so as to allow the bulk material to flow by gravity through the openings generally uniformly throughout the length of the hold, gradually moving all of the gates to an unobstructing position in a manner consistent with a uniform flow and without overloading the conveyor, allowing material to flow through the openings in such manner until the gates are in full unobstructing positions and no further material will flow by gravity through the openings, moving all of the gates to obstructing positions, and transferring material remaining in the hold adjacent one end thereof toward the opening in the floor adjacent said one end of the hold and thence progressively longitudinally of the hold moving material adjacent each opening toward such opening while slowly opening the gate of each opening out of obstructing relation thereto as material is moved toward such opening.

23. A system in accordance with claim 4, wherein selectively operable means are also provided for controlling the operation of said power means so as to effect controlled individual movement of each of said gates between said first and second positions, said means being such as to permit movement of any of said gates to be halted at any point between said positions so as to permit selective variation in the effective size of an opening.

References Cited

UNITED STATES PATENTS

| | | | |
|---|---|---|---|
| 1,737,343 | 11/1929 | Sensibar | 214—15 |
| 2,288,763 | 7/1942 | Winship et al. | 214—41 |
| 2,579,153 | 12/1951 | Meissner | 214—16 |
| 3,066,809 | 12/1962 | Burridge et al. | 214—41 |
| 3,077,995 | 2/1963 | Booth et al. | 214—17 |
| 3,148,784 | 9/1964 | Pickrell | 214—15 |

ROBERT G. SHERIDAN, *Primary Examiner.*